United States Patent [19]

Yoshida

[11] Patent Number: 5,189,696

[45] Date of Patent: Feb. 23, 1993

[54] DATA COMMUNICATION APPARATUS

[75] Inventor: Takehiro Yoshida, Tokyo, Japan

[73] Assignee: Canon Kabushiki Kaisha, Tokyo, Japan

[21] Appl. No.: 689,522

[22] Filed: Apr. 23, 1991

[51] Int. Cl.[5] .................. H04M 11/00; H04M 1/66
[52] U.S. Cl. .................... 379/355; 379/356; 379/354; 379/200; 379/188
[58] Field of Search ............. 379/354, 355, 356, 199, 379/200, 188, 194

[56] References Cited

U.S. PATENT DOCUMENTS

| | | | |
|---|---|---|---|
| 3,920,936 | 11/1975 | Mogtader | 379/200 |
| 4,524,393 | 6/1985 | Ohzeki | 358/257 |
| 4,646,160 | 2/1987 | Sizuka et al. | 379/355 |
| 4,741,021 | 4/1988 | Kotai et al. | 379/355 |
| 4,764,951 | 8/1988 | Kotani et al. | 379/355 |
| 4,802,202 | 1/1989 | Takashi et al. | 379/67 |
| 4,833,707 | 5/1989 | Serret, Jr. | 379/188 |
| 4,894,861 | 1/1990 | Fujioka | 379/374 |
| 4,920,560 | 4/1990 | Kageyama | 379/100 |

FOREIGN PATENT DOCUMENTS 316883 5/1989 European Pat. Off.
347155 12/1989 European Pat. Off.

OTHER PUBLICATIONS

Patent Abstract of Japan, vol. 13, No. 264, (E-774) (3612), Jun. 19, 1989.
Patent Abstracts of Japan, vol. 12, No. 389, (E-669) (3236), Oct. 17, 1988.
Patent Abstracts of Japan, vol. 13, No. 304, (E-786) (3652), Jul. 12, 1989.

Primary Examiner—James L. Dwyer
Assistant Examiner—M. Shehata
Attorney, Agent, or Firm—Fitzpatrick, Cella, Harper & Scinto

[57] ABSTRACT

Data communication apparatus which dials based on the preregistered telephone numbers, prohibits or allow data communication based on the telephone number data the apparatus includes a memory to memorize the data for judging if data communication is allowed for a telephone number an a control to control dialing based on the result of such judgment.

10 Claims, 4 Drawing Sheets

DATA COMMUNICATION APPARATUS

BACKGROUND OF THE INVENTION

1. Field of the Invention

This invention relates to a data communication apparatus, particularly to such data communication apparatus having automatic dialling function such as one-touch dialing or abbreviation dialing.

2. Related Background Art

Traditionally, a facsimile apparatus having one-touch dialing function or abbreviation dialing function is known as an apparatus of this kind. Such one-touch dialing technique is described in U.S. Pat. No. 4,833,705 and U.S. patend application Ser. Nos. 485,475 (filed on Feb. 27, 1990) and 663,198 (refiled on Feb. 28, 1991).

Recently, to refuse the fax reception inconvenient to users such as direct mail, there is a proposal about such facsimile apparatus which refuses the fax reception from stations other than those registered on the one-touch dials. U.S. patent application Ser. No. 289,014 (filed on Feb. 23, 1988) covers such facsimile apparatus.

In the above reception refusal system which utilizes registered phone numbers, the phone numbers of stations to which data is not sent but from which data is received may be registered. Accordingly, if such phone numbers are registered, an operator may erroneously dial the stations from which a call is merely received.

SUMMARY OF THE INVENTION

An object of the present invention is to improve data communication apparatus in light of the above-mentioned problems.

Another object of the present invention is to use a memory for storing dial numbers for automatic dialing, as a memory for storing partner stations from which a call is to be received, and allows the memory to store partner stations to which no call is issued but from which a call is receivable.

Another object of the present invention is to use a memory for storing dial numbers for automatic dialing such as one-touch dialing, as a memory for storing partner stations from which a call is to be received, or allows the memory to store partner stations to which no call is issued but from which a call is receivable.

Other objects of the present invention will become evident from the detailed explanation of the preferred embodiments and drawings which follow.

BRIEF DESCRIPTION OF THE DRAWINGS

FIGS. 2A, 2B-1 and 2B-2 are flow charts showing a control operation of the embodiment.

DETAILED DESCRIPTION OF THE PREFERRED EMBODIMENTS

What follows below is a detailed explanation about an embodiment of the present invention with reference to drawings.

Figure 1:
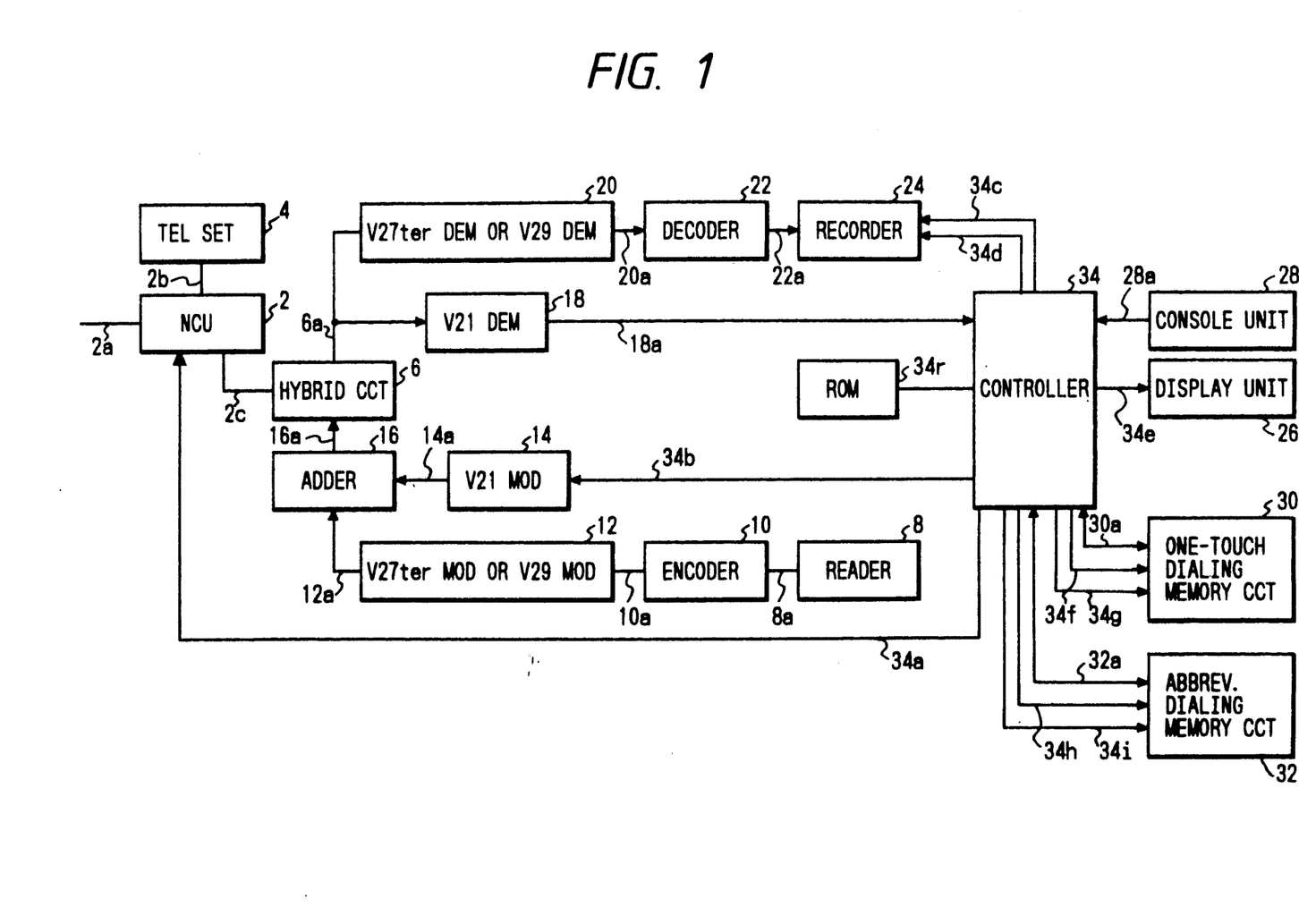
FIG. 1 is a block diagram showing a structure of a facsimile apparatus of one embodiment.

In FIG. 1, a network control unit (NCU) 2 connects a telephone network to a terminal on the line to use it for a data communication, and performs connection control of a telephone exchange network, or switching to a data communication path by a built-in CML relay, or holding of a loop.

A signal line 2a corresponds to a telephone line. The NCU 2 receives a signal on a signal line 34a, and if this signal has "0" level, it connects the telephone line to a telephone set side, i.e., connects the signal line 2a to a signal line 2b (the CML relay OFF). Upon reception of the signal on the signal line 34a, if the received signal has "1" level, the NCU 2 connects the telephone line to a facsimile apparatus side, i.e., connects the signal line 2a to a signal line 2c (the CML relay ON). In a normal state, the telephone line 2a is connected to a telephone set 4 side for manual control or a speech communication.

A hybrid circuit 6 separates transmission and reception signals. More specifically, a transmission signal on a signal line 16a propagates along the signal line 2c, and is sent onto the telephone line 2a via the NCU 2. A signal sent from a station on the other end of the line is input to the NCU 2, and is then output onto a signal line 6a via the signal line 2c.

Numeral 8 denotes a reader which sequential reads one-line image signals of a transmitting document along a main scan direction to produce binary black and white signal sequence. It may comprise an imaging device such as a charge coupled device (CCD) and an optical system. The binary black and white signal sequences are supplied to a signal line 8a.

Numeral 10 denotes an encoder which receives the data on the signal line 8a and supplies coded data (for example, MH (modified Hoffmann) coded or MR (modified Reed) coded data) to a signal line 10a.

Numeral 12 denotes a modulator which modulates in accordance with the CCITT Recommendation V27 ter (differential phase modulation) or V29 (quadrature modulation). The modulator 12 receives the signal on the signal line 10a, modulates it and supplies the modulated data to a signal line 12a.

Numeral 14 denotes a modulator which modulates in accordance with the CCITT Recommendation V21. The modulator 14 receives a protocol signal on a signal line 34b, modulates it and supplies the modulated data to a signal line 14a.

Numeral 16 denotes an adder which receives the signals on the signal lines 12a and 14a and supplies a sum to a signal line 16a.

A numeral 18 denotes a demodulator which demodulates in accordance with the CCITT Recommendation V21. The demodulator 18 receives the signal on the signal line 6a, demodulates it in accordance with V21 and supplies the demodulated data to a signal line 18a.

Numeral 20 denotes a demodulator which demodulates in accordance with the CCITT Recommendation V27 ter (differential phase modulation) or V29 (quadrature modulation). The demodulator 20 receives the signal on the signal line 6a, demodulates it and supplies the demodulated data to a signal line 20a.

Numeral 22 denotes a decoder which receives the data on the signal line 20a and supplies a decoded data (for example, MH (modified Hoffmann) decoded or MR (modified Reed) decoded data) to a signal line 22a.

Numeral 24 is a recorder in which the decoded data output on the signal line 22a are input one after another to make recording for each line. In response to a record instruction pulse on the signal line 34d, the recorder inputs a signal (character) output on a signal line 34c converts its information from character to dot pattern for recording.

Numeral 26 is a display unit. On the display unit, dial numbers are displayed at the time of registration of one-touch dial number or abbreviated dial number, or at the time of such one-touch dialing or abbreviated dialing. Also, the dialing unit indicates that the dial number is permissible for only reception or the dial number is not registered. The display unit 26 inputs and displays the data on the signal line 34e.

Numeral 28 denotes a console unit. When such key as one-touch dial key, abbreviated dial key, ten-key, alphabet key, * key, # key, TEL registration key, set key, reception only key or start key is depressed, information corresponding to the depressed key is output to the signal line 28a.

Numeral 30 is a one-touch dial memory circuit. The present embodiment allows the registration of 24 different numbers for one-touch dialing. Accordingly, numbers 00 to 23 are allocated to different dial numbers. The number for one-touch dialing stations is not necessarily limited to 24. The number can be more than 24 or less than 24.

When the one-touch dial information is written in the one-touch dial memory circuit, such data as one of the numbers 00 to 23, "*" and dial numbers (e.g. 03-7×-8-1111) or, if reception only, "R" data are output to the signal line 30a and then a write pulse is produced on the signal line 34f.

When memorized one-touch dial information is read out, one of the numbers 00 to 23 is output to the signal line 30a and then a read pulse is produced on the signal line 34g. Thereby, the one-touch dial information memorized with respect to said one of the numbers 00 to 23 and information as to whether it is reception only or not (the "R" data is output only in the case of reception only) are output to the signal line 30a.

Numeral 32 is an abbreviated dial memory circuit. The present embodiment allows the registration of 100 abbreviated dial numbers. Hence, the numbers 00 to 99 are allocated to 100 different dial numbers.

When abbreviated dial infomration is written in the abbreviated dial memory circuit, such data as one of the numbers from 00 to 99, "*" and dial numbers (e.g. 03-758-2222) and, in the case of reception only, the "R" data are output to a signal line 32a, and then a write pulse is produced on a signal line 34h. When the memorized abbreviated dial information is read out, one of the numbers 00 to 99 is output to the signal line 32a and then a load pulse is produced on a signal line 34i.

In this way, the memorized abbreviated dial information on said one of the numbers 00 to 99 and information as to whether it is reception only (the "R" data is output in the case of reception only) are output to the signal line 32a.

A control circuit 34 consists of a microprocessor and others, and executes an operation as outlined hereinbelow, according to the later-mentioned program stored in ROM34r.

Using the console unit, partners for the one-touch dialing and 100 partners for the abbreviated dialing can be registered.

The registration of the one-touch dial is such that on the console unit, the TEL registration button and the one-touch dial key are depressed and then the dial number of a destination is input from the ten-key, followed by depressing of the set key.

The registration of the following one-touch dial is described. If after the dial number of the destination is input from the ten-key, the key for reception only is depressed and also the set key is depressed, the one-touch dial is registered as a dial number for reception only.

Registration of the abbreviated dial is made in such a way that on the console unit, the TEL registration button and the * key are depressed and two-digit number is input from the ten-key as the abbreviated dial number, followed by inputting a dial number of a destination and depressing the set key.

The registration of the following abbreviated dial is described. If, after inputting a dial number of a destination from the ten-key, the reception only key and then the set key are depressed, the abbreviated dial number is registered as a number for reception only.

All of these dial numbers are stored in the one-touch dial memory circuit and the abbreviated dial memory circuit.

When a facsimile apparatus is in reception state and a manual operation mode is selected, the apparatus starts a facsimile receiving operation. In the case of automatic operation, after receiving NSS/TSI/DCS signals and a training.TCF signal, it is checked whether or not lower 6 digit numerical information of the TSI signal is equal to lower 6 digit numerical information of any of the one-touch dial numbers of abbreviated dial numbers.

If it is affirmative, the facsimile receiving operation is continued. If not, a DCN signal is transmitted and the facsimile receiving operation is interrupted. Also, when no TSI signal is received from a partner station, the apparatus (receiver) refuses facsimile reception.

If the facsimile reception is refused, the receiver records the message "Facsimile reception has been refused" and then outputs management information containing the refused dial number and its corresponding abbreviated user name, etc.

If the one-touch dial for reception only or the abbreviated dial is selected, no dial operation is carried out, but the message, "This dial number is registered for reception only" for example, is displayed to notify an operator.

When a one-touch or abbreviated dial not registered is selected, no dial operation is executed and the message, "This dial number is not registered" for example, is displayed to notice an operator, making the dial number distinct from one registered as a dial number for reception only.

Figure 2A:
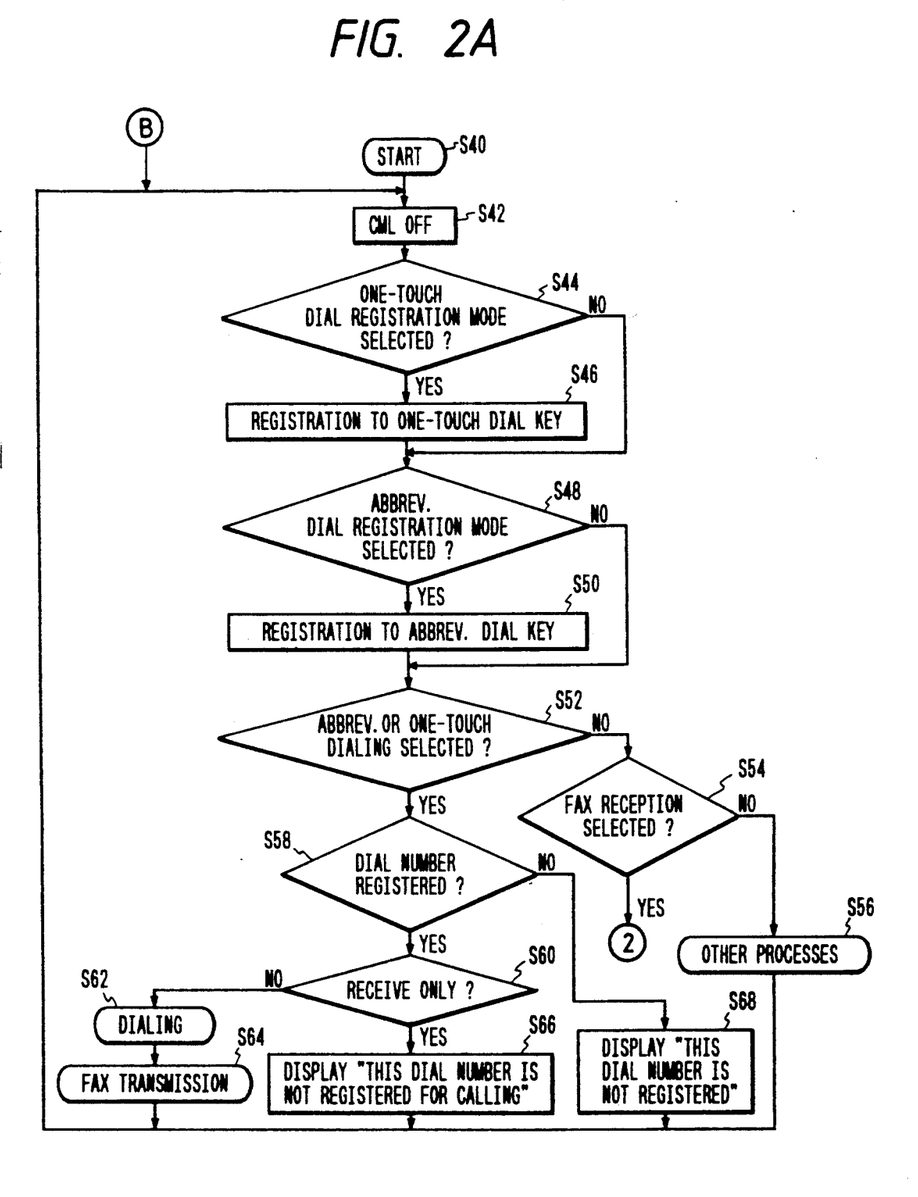
Figures 2B, 2B:
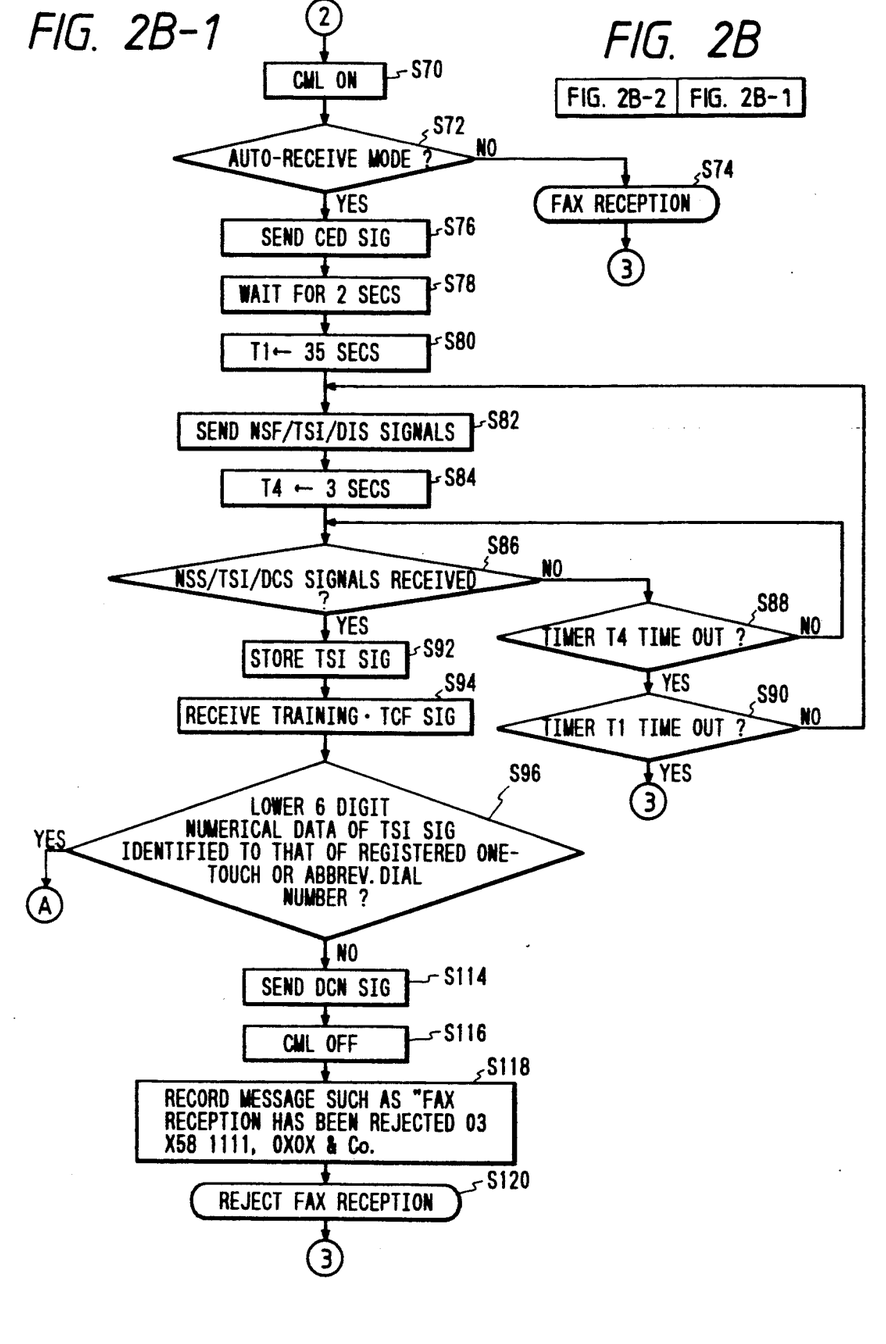
Figure 2B:
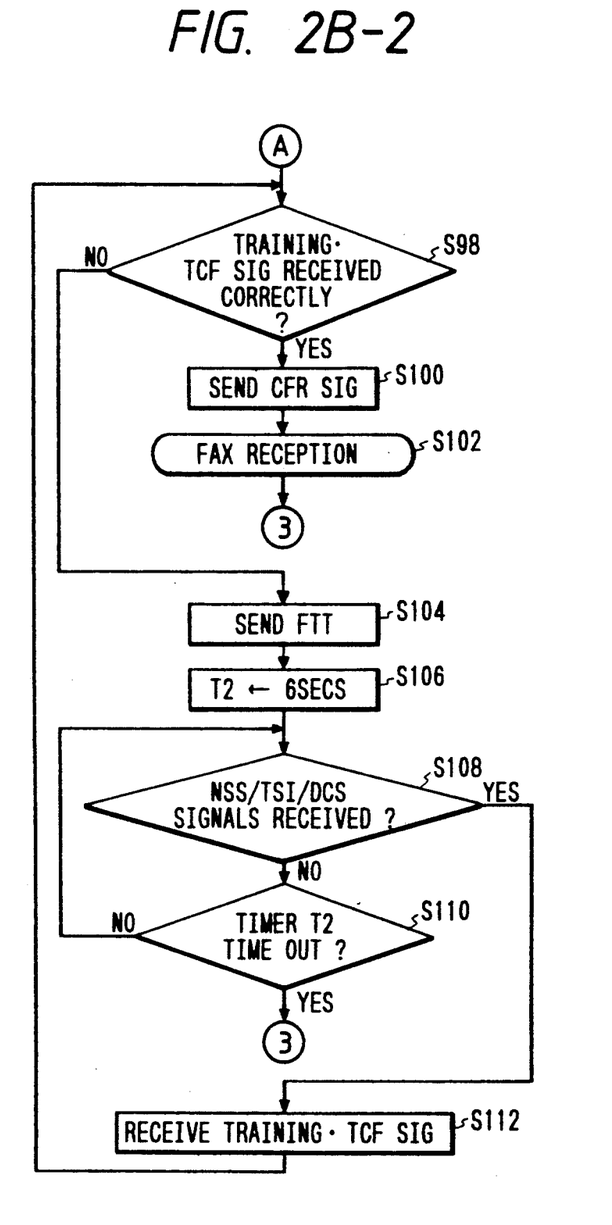

FIGS. 2A and 2B show a flow of a dialing control program of the control circuit 34 stored in ROM34r.

In a step S42 of FIG. 2A, a signal of level "0" is output to the signal 34a to turn off the CML relay of the NCU2 and connect the line 2a to the telephone set 4.

In a step S44, it is checked whether a one-touch dial registration mode is selected or not, that is, whether or not the one-touch key is depressed following the depression of the TEL registration key on the console unit. If the top is YES, one-touch dial number is registered in the one-touch dial memory circuit 30.

At this time, if the dial number is for reception only, that is also registered (Step S46). If the one-touch dial registration mode is not selected, the flow advances to a step S48.

The step S48 judges whether an abbreviated dial registration mode is selected, that is, whether the key * and the two digit numerals, following the TEL registration key on the console unit are depressed or not.

If the abbreviated dial registration mode is selected, a designated abbreviated dial number is registered in the abbreviated dial memory circuit 32. If the dial number is for reception only, that is also registered (Step S50). If the abbreviated dial registration mode is not selected, the flow goes to a step S52.

The step S52 judges whether or not the abbreviated dialing or one-touch dialing is selected. If the dialing is selected, the flow goes to a step S58 and, if not, to a step S54.

The step S54 judges whether facsimile reception is selected or not. If the facsimile reception is selected, the flow advances to a step S70 and, if not, to other processes (Step S56).

The step S58 judges whether a dial number to be called is registered to the selected dial key or not. When any dial number is registered in the step, the flow goes to a step S60 and, if not, to a step S68.

The step S60 judges whether the selected dial corresponds to a dial number approved for reception only. If it is an approved number, the flow goes to a step S66 and, if not to a step S62.

In the step S62, an actual calling signal is sent.

In the step S64, a known image transmission operation is conducted.

The step S66 displays, via a signal line 34e, the message, "This dial number is registered for reception only" on the display unit 26.

The step S68 displays via the signal line 34e, the message, "This dial is not registered" on the display unit 26.

A step S70 in FIG. 2B outputs a signal of level "2" on the signal line 34a to turn CML on.

A step S72 judges whether an automatic reception mode is set or not. In the case of the automatic reception mode, a CED signal is transmitted (Step S76), it waits for two seconds (Step S78), and a T1 timer is set to 35 seconds (Step S80). If the reception mode is not automatic, the flow goes to the facsimile reception (Step S74).

The step S82 transmits NSF/CSI/DIS signals.

The step S84 sets a T4 timer to 3 seconds.

The step S86 judges whether the NSS/TSI/DCS signals is received or not. If the NSS/TSI/DCS signals are received, the flow moves to a step S92 and, if not, to a step S88.

The step S88 judges whether the T4 timer times out. If YES, the flow goes to a step S90 and, if NO, to the step S86.

The step S90 judges whether the T1 timer times out. If YES, the flow goes to the step S42 and, if NO, to a step S82.

The step S92 memorizes the TSI signal received.

The step S94 receives the training.TCF signal.

When the TSI signal is received, a step S96 judges whether or not lower 6-digit numerical information of the signal is identified to that of any of the registered one-touch or abbreviated dial numbers. If YES in the step, the flow goes to a step S98 and, if NO, to a step S114. Also in case the TSI signal is not received, the flow goes to the step S114.

The step S98 judges whether the reception of the training.TCF signal is successful at the step S94 or a step S112. If it was YES, CFR signal is transmitted (Step S100) and the facsimile reception is started (Step S102).

If not successful, a FTT signal is transmitted (Step S104) and a T2 timer is set to 6 seconds (Step S106).

A step S108 judges whether the NSS/TSI/DCS signals are received or not. If the NSS/TSI/DCS signals are received, the training.TCF signal is received (Step S112). If not, the flow goes to a step S110.

The step S110 judges whether the T2 timer times out. If YES, the flow goes to the step S42 and, if not, to the step S108.

The step S114 transmits a DCN signal.

A step S116 outputs a signal of level "0" to the signal line 34a to turn CML off.

The step S118 outputs on the signal line 34c a message such as "Facsimile reception" has been refused. Telephone number (e.g. 03-7X8-1111), Abbreviated user name (e.g. XX & Co.), followed by the provision of a record instruction pulse to the signal line 34d to record the above message.

A step S120 refuses facsimile reception from the partner station.

According to present embodiment, a facsimile apparatus capable of abbreviated dialing and one-touch dialing provides the structure for registration of dial numbers for facsimile reception only to the abbreviated dial, the one-touch dial or the like. When the dial number for facsimile reception only is selected, no dial operation is executed and that is displayed. Also, facsimile reception is allowed from partners of all the dial numbers registered to the abbreviated dial, the one-touch dial or the like, but facsimile reception is not allowed from partners of the other dial numbers to output information on the partners such as the dial number, the abbreviated user name.

For this reason, when the one-touch dial number or abbreviated dial number for no dial operation and reception only is selected, it can be avoided to execute a dial operation for the dial number and the fact can be displayed. For example, such message as "This dial number is registered for reception only" is displayed.

As a result, there is no failure that the number for reception only is dialed.

In addition, dial numbers for reception only may be registered not only to the one-touch dial and the abbreviated dial, but to memory areas for registering only the dial numbers for reception only. In this case, reception is allowed from partners who are registered to the one-touch dials, the abbreviated dials and the memory areas for the message reception approval dial number.

Using the console unit, partners for the one-touch dialing and 100 partners for the abbreviated dialing can be registered.

The registration of the one-touch dial is such that on the console unit, the TEL registration button and the one-touch dial key are depressed and then the dial number of a destination is input from the ten-key, followed by depressing of the set key.

The registration of the following one-touch dial is described. If after the dial number of the destination is input from the ten-key, the key for reception only is depressed and also the set key is depressed, the one-touch dial is registered as a dial number for reception only.

Registration of the abbreviated dial is made in such a way that on the console unit, the TEL registration button and the * key are depressed and two-digit number is input from the ten-key as the abbreviated dial number, followed by inputting a dial number of a destination and depressing the set key.

The registration of the following abbreviated dial is described. If, after inputting a dial number of a destination from the ten-key, the reception only key and then the set key are depressed, the abbreviated dial number is registered as a number for reception only.

All of these dial numbers are stored in the one-touch dial memory circuit and the abbreviated dial memory circuit.

When a facsimile apparatus is in reception state and a manual operation mode is selected, the apparatus starts a facsimile receiving operation. In the case of automatic operation, after receiving NSS/TSI/DSC signals and a training.TCF signal, it is checked whether or not lower 6 digit numerical information of the TSI signal is equal to lower 6 digit numerical information of any of the one-touch dial numbers of abbreviated dial numbers.

If it is affirmative, the facsimile receiving operation is continued. If not, a DCN signal is transmitted and the facsimile receiving operation is interrupted. Also, when no TSI signal is received from a partner station, the apparatus (receiver) refuses facsimile reception.

If the facsimile reception is refused, the receiver records the message "Facsimile reception has been refused" and then outputs management information containing the refused dial number and its corresponding abbreviated user name, etc.

If the one-touch dial for reception only or the abbreviated dial is selected, no dial operation is carried out, but the message, "This dial number is registered for reception only" for example, is displayed to notify an operator.

When a one-touch or abbreviated dial not registered is selected, no dial operation is executed and the message, "This dial number is not registered" for example, is displayed to notice an operator, making the dial number distinct from one registered as a dial number for reception only.

This invention can be applied not only to a facsimile apparatus but also to various kinds of data communication equipment such as a telex machine.

This invention is not limited to the above-mentioned embodiment but can be modified in many ways.

I claim:

1. A data communication apparatus comprising:
    memory means capable of storing telephone number data and also information representing data communication permissible telephone number data;
    dialing means for executing a dialing operation in accordance with the telephone number data stored in said memory means;
    receiving means for receiving telephone number data of a partner station sent from the partner station;
    instructing means for instructing a dialing operation based on the telephone number data stored in the memory means; and
    control means for controlling the dialing operation in response to an instruction of said instruction means, and for, upon reception of a call, comparing telephone number data of a partner station received by said receiving means with the telephone number data stored in the memory means to control data communication in accordance with a comparison result;
    wherein when a dialing operation is executed by an instruction of said instruction means, said control means judges whether or not the information is stored in said memory means, and if it is judged that the information is stored, said control means prohibits the dialing operation.

2. An apparatus according to claim 1, said memory means stores telephone number data of abbreviated dials.

3. An apparatus according to claim 1 wherein said memory means stores telephone number data of one-touch dials.

4. An apparatus according to claim 1 further comprising display means for displaying that the telephone number data is not registered as dialing permissible telephone number data, wherein said control means controls said display means to display when the dialing operation is not executed on the basis of a result of the judgment.

5. A method for data communication in which a call is issued on the basis of telephone number data stored in advance and also the data communication is allowed or refused on the basis of the telephone number data, comprising the steps of:
    storing the telephone number data information representing that the telephone number data is a data communication permissible one;
    judging whether or not the information representing that the telephone number data is a data communication permissible one is stored when a dialing operation is executed on the basis of the stored telephone number data; and
    prohibiting a dialing operation when it is judged that the information is stored in said judging step.

6. A method according to claim 5, further comprising the step of displaying that the telephone number data is not registered as permissible telephone number data.

7. A method according to claim 5 wherein the memorized telephone number data are telephone number data of one-touch dials or abbreviated dials.

8. A data communication apparatus comprising:
    a memory circuit capable of memorizing not only telephone number data but also information representing data communication permissible telephone number data;
    a circuit for receiving telephone number data of a destination partner;
    a control circuit for executing a dialing operation according to the telephone number data stored in said memory circuit and comparing the telephone number data stored in said memory circuit with received telephone number data to control data communication on the basis of the comparison results, wherein said control circuit judges, at a time of dialing, whether the information indicating the data communication permissible telephone number data exists or not and controls the dialing operation on the basis of the judgment result.

9. A method according to claim 8, wherein if the information indicating the data communication permissible telephone number data is memorized, said control circuit prohibits the dialing operation.

10. A method according to claim 8, wherein said memory circuit stores telephone number data of one-touch dials or abbreviated dials.

* * * * *

UNITED STATES PATENT AND TRADEMARK OFFICE
CERTIFICATE OF CORRECTION

PATENT NO. : 5,189,696

DATED : February 23, 1993

INVENTOR(S) : TAKEHIRO YOSHIDA

Page 1 of 2

It is certified that error appears in the above-identified patent and that said Letters Patent is hereby corrected as shown below:

Title page,
AT [30] FOREIGN APPLICATION PRIORITY DATA

Insert --[30] Foreign Application Priority Data
         Apr. 26, 1990 [JP]   Japan..........2-108596--.

Title page,
AT [56] REFERENCES CITED

U.S. Patent Documents,
        "Sizuka et al." should read --Iizuka et al.--.
        "Kotai et al." should read --Kotani et al.--
        "Takashi et al." should read --Takahashi et al.--.

Title page,
AT [57] ABSTRACT

Line 2, "allow" should read --allows--.
    Line 4, "data the" should read --data.  The--.
    Line 6, "an" should read --and--.

COLUMN 1

Line 8, "dialling" should read --dialing--.
    Line 15, "patend" should read --patent--.

COLUMN 4

Line 53, "top" should read --answer--.

UNITED STATES PATENT AND TRADEMARK OFFICE
CERTIFICATE OF CORRECTION

PATENT NO. : 5,189,696
DATED : February 23, 1993
INVENTOR(S) : TAKEHIRO YOSHIDA

It is certified that error appears in the above-identified patent and that said Letters Patent is hereby corrected as shown below:

COLUMN 5

Line 16, "not" should read --not,--.
Line 24, "dial" should read --dial number--.
Line 37, "is" should read --are--.

COLUMN 6

Line 12, "present" should read --the present--.

COLUMN 8

Line 3, "said" should read --wherein said--.

Signed and Sealed this

Twenty-eight Day of March, 1995

Attest:

BRUCE LEHMAN

Attesting Officer    Commissioner of Patents and Trademarks